United States Patent
Gross et al.

(10) Patent No.: US 8,164,434 B2
(45) Date of Patent: Apr. 24, 2012

(54) COOLING-CONTROL TECHNIQUE FOR USE IN A COMPUTER SYSTEM

(75) Inventors: Kenny C. Gross, San Diego, CA (US); Kalyanaraman Vaidyanathan, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 498 days.

(21) Appl. No.: 12/485,221

(22) Filed: Jun. 16, 2009

(65) Prior Publication Data

US 2010/0315223 A1    Dec. 16, 2010

(51) Int. Cl.
*G08B 23/00* (2006.01)
*G08B 17/00* (2006.01)
*G06F 1/20* (2006.01)
*H05K 7/20* (2006.01)

(52) U.S. Cl. ........ 340/501; 340/500; 340/584; 340/588; 361/679.46; 361/688; 374/1; 374/100; 702/130; 713/300

(58) Field of Classification Search .................. 340/501
See application file for complete search history.

(56) References Cited

U.S. PATENT DOCUMENTS

| | | | |
|---|---|---|---|
| 6,654,894 B2 * | 11/2003 | Kaminski et al. | 713/300 |
| 6,792,550 B2 * | 9/2004 | Osecky et al. | 713/300 |
| 6,935,130 B2 * | 8/2005 | Cheng et al. | 62/259.2 |
| 7,020,802 B2 | 3/2006 | Gross | |
| 7,248,980 B1 | 7/2007 | Gross | |
| 7,425,812 B2 * | 9/2008 | Goldberg | 318/610 |

* cited by examiner

*Primary Examiner* — Donnie Crosland
(74) *Attorney, Agent, or Firm* — Park, Vaughan, Fleming & Dowler LLP; Steven E. Stupp

(57) ABSTRACT

A method for providing control signals to a fan in a computer system is described. During the method, an electronic device receives temperature measurements and a fan-speed measurement performed in the computer system. Using a pattern-recognition model, the electronic device validates the measurements, and excludes any inaccurate measurements, such as those associated with drifting or failed sensors. Next, the electronic device determines control signals for a fan in the computer system using a model of coolant flow in the computer system and/or a slope of a phase-frequency curve of a cross power spectral density function corresponding to a pair of temperature profiles measured, as a function of time, by a pair of thermal sensors. Then, the determined control signals are provided to the fan.

20 Claims, 6 Drawing Sheets

COOLING-CONTROL TECHNIQUE FOR USE IN A COMPUTER SYSTEM

BACKGROUND

1. Field

The present disclosure relates to a techniques for cooling computer systems. More specifically, the present disclosure relates to techniques for generating control signals for a fan in a computer system based on a determined cooling rate of the computer system.

2. Related Art

Convective heat transport mechanisms, such as heat transported by flowing air, are often used to remove the heat generated by components in computer systems. In order to properly regulate the temperature in these computer systems, the rate of heat transport, as indicated by the air-flow rate, and more generally, the mass flow rate (e.g., in cubic feet per minute or CFM) needs to be determined to ensure that it matches or surpasses the rate of heat generation.

However, it is often infeasible to measure the air-flow rate in a computer system. In particular, sensors that directly measure the air-flow rate often have poor reliability and typically require frequent recalibration (which is economically prohibitive in many applications). As a consequence, cooling-control techniques in many computer systems are often based on dual 'proxy variables' for the air-flow rate. For example, a measure of the mean voltage applied to a fan motor (such as pulse-width-modulation or PWM metric of a fan-motor power signal) is often used as a proxy variable for the fan's rotation speed (in revolutions per minute or RPM). In turn, the fan's rotation speed is typically used as a proxy variable for the air-flow rate. This 'dual proxy' relationship typically requires two separate calibration processes, each of which is subject to possible errors.

For example, a PWM metric may be calibrated against the fan RPM to determine a PWM-vs.-RPM curve that is specific to a given type of fan in a given computer system. However, this curve is often strongly dependent on the mechanical integrity of the fan motor, shaft and blades. In particular, the PWM-vs.-RPM curve is typically determined when a fan is new (i.e., the fan motor is new, the bearings are as round as they will ever get, the shaft is well balanced and centered with little or no rotational eccentricity, the lubrication levels are optimal, etc.). As the fan ages, wear and other changes will increase friction levels, which make the previously determined PWM-vs.-RPM curve inaccurate. These inaccuracies can adversely impact the cooling capability and the temperature regulation in a computer system that includes the fan.

Similarly, a calibrated RPM-vs.-CFM curve may be determined by measuring air flow in the computer system using an instrumented flow chamber at a particular altitude. However, because of barometric-pressure and altitude variations, the resulting curve may be inaccurate. To address this problem, many computer systems are calibrated at their maximum rated operating altitude (for example, 10,000 ft.). As a consequence, these computer systems are usually overcooled at lower altitudes. While this approach is safe, it wastes energy and results in errors during temperature regulation.

In addition, the RPM-vs.-CFM curve of a computer system may change over time because of air-flow impedance changes, such as flow inhibitors or air-flow 'short circuits' in the computer system. Typical flow inhibitors include: buildup of dust on air filters, changes to the system configuration (such as adding, removing or moving internal components in the computer system), and/or unintentional obstructions (such as paper or foreign objects accidentally left inside of the computer system). Moreover, air-flow 'short circuits' can occur when an operator leaves an access panel in the computer system open.

Consequently, the use of proxy variables to determine the air-flow rate is often subject to errors, which increases the probability of overcooling (which wastes energy, and increases acoustic noise and vibration) or undercooling (which accelerates reliability problems, and can lead to down-time or temperature-induced shutdown of the computer system).

Hence, what is needed is a technique for determining the air-flow rate and providing accurate control signals to a cooling fan in a computer system without the above-described problems.

SUMMARY

One embodiment of the present disclosure relates to an electronic device that provides control signals to a cooling device in a computer system. During operation, the electronic device receives temperature measurements from thermal sensors in the computer system and receives a cooling-device speed measurement from a cooling-device speed sensor in the computer system. Then, the electronic device validates the temperature measurements using a pattern-recognition model based at least on the temperature measurements and the cooling-device speed measurement. Next, the electronic device uses a model of air flow in the computer system to determine the control signals. Moreover, the electronic device provides the control signals to the cooling device.

Note that the model of air flow may provide a current air-flow rate in the computer system based at least on the validated temperature measurements and the cooling-device speed measurement. Moreover, the model of air flow in the computer system may be based at least on air-flow calibration data collected in an exemplary computer system, which may be the same type of computer system as the computer system. Furthermore, the pattern-recognition model may include a nonlinear, nonparametric regression model.

Additionally, the cooling-device speed measurement may be based at least on power signals provided to the cooling device.

The air-flow calibration data may include air-flow measurements performed using an air-flow sensor in the exemplary computer system. However, the current air-flow rate may be determined without performing air-flow measurements using an air-flow sensor in the computer system.

In some embodiments, validating the temperature measurements involves identifying drift or failure in one or more of the thermal sensors and, if such drift or failure of one or more of the thermal sensors is identified, excluding the temperature measurements associated with the one or more thermal sensors.

Furthermore, in some embodiments the electronic device de-quantizes the temperature measurements to increase a resolution of the temperature measurements.

In some embodiments, the model of air flow in the computer system is based on simulations of air flow in the computer system, thereby compensating for differences in the configuration of the computer system and the exemplary computer system.

In some embodiments, the control signals are determined based on a slope of a phase-frequency curve of a cross power spectral density function corresponding to a pair of temperature profiles measured, as a function of time, by a pair of thermal sensors (instead of or in addition to using the model of air flow).

Additionally, in some embodiments the electronic device generates an alert based at least on a current air-flow rate, and the computer system provides the alert to an operator of the computer system. For example, the alert can include: a warning that the temperature in the computer system is increasing beyond a threshold value, a warning that the air flow in the computer system has changed, and/or a warning that an air-flow impedance in the computer system has changed.

Another embodiment provides a method including at least some of the above-described operations.

Another embodiment provides the computer system, which performs at least some of the above-described operations of the electronic device.

Another embodiment provides a computer-program product that facilitates the above-described operations of the electronic device and/or the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a computer system, an electronic device in the computer system, a method for providing control signals to a fan in a computer system, and a computer-program product (i.e., software) for use in the computer system are described. During the method, the electronic device receives temperature measurements and a fan-speed measurement performed in the computer system. Using a pattern-recognition model, the electronic device validates the measurements, and excludes any inaccurate measurements, such as those associated with drifting or failed sensors. Next, the electronic device determines control signals for a fan in the computer system using a model of air flow in the computer system and/or a slope of a phase-frequency curve of a cross power spectral density (CPSD) function corresponding to a pair of temperature profiles measured, as a function of time, by a pair of thermal sensors. Then, the determined control signals are provided to the fan.

In contrast with control techniques based at least on proxy variables (such as PWM and/or RPM), the use of the model of air flow and/or the CPSD facilitates more accurate estimates of the air flow in the computer system, and thus, improved temperature control and reduced energy consumption.

In the discussion that follows, heat transfer via air flow is used as an illustrative example. However, in other embodiments the control technique is used to regulate heat transport via mass transport of a wide variety of 'coolants,' including other gases and/or liquids. Furthermore, even though a computer system is used as an illustrative example, the control technique may be used to regulate temperature in a wide variety of devices, systems and applications.

Figure 1A:
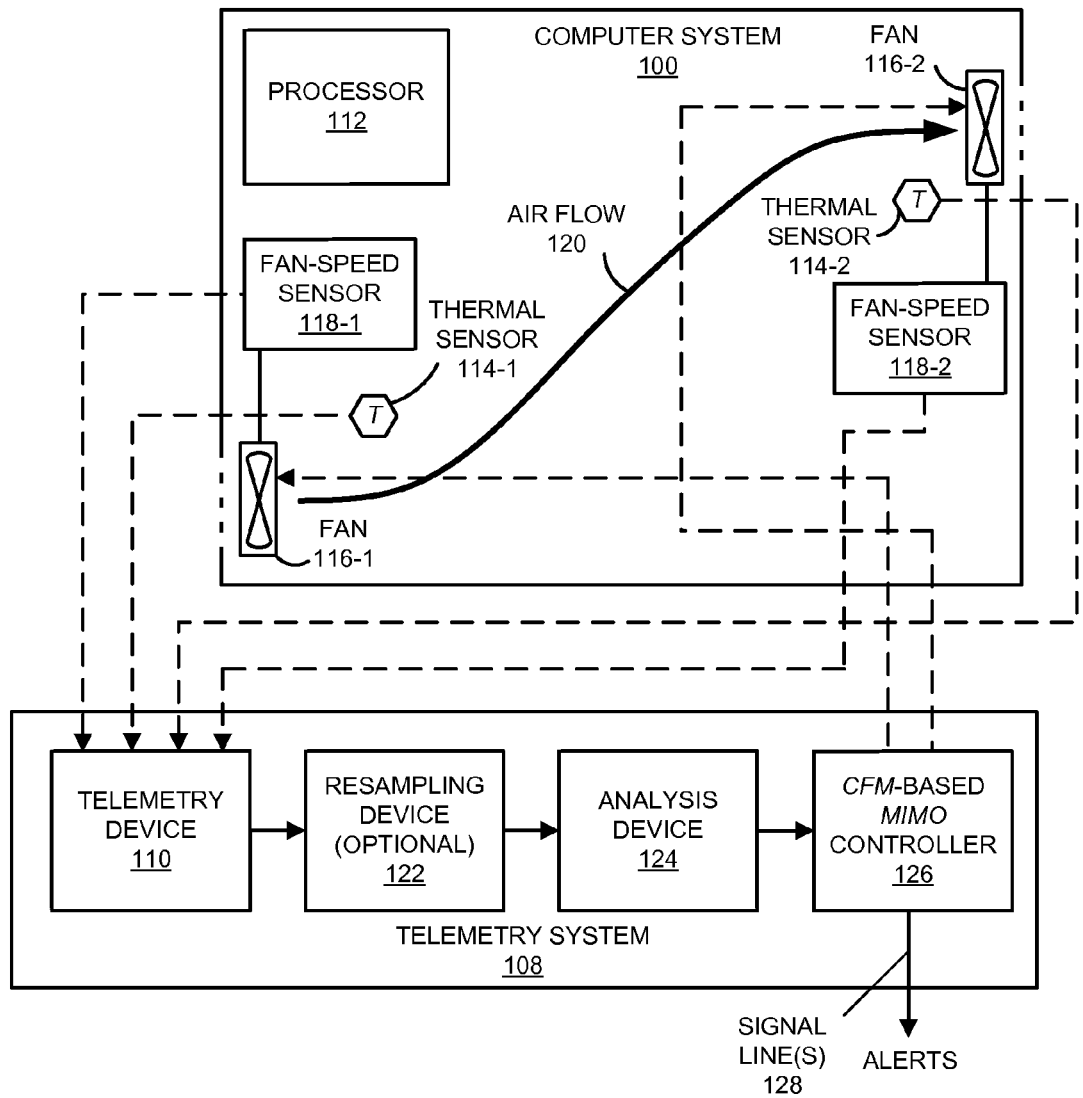
FIG. 1A is a block diagram illustrating a computer system in accordance with an embodiment of the present disclosure.

We now describe embodiments of a computer system. FIG. 1A presents a block diagram illustrating a computer system 100. This computer system integrates telemetry data from a real-time continuous telemetry system 108. In computer system 100, telemetry device 110 gathers information (and, in particular, telemetry data) from various physical sensors and monitoring tools within computer system 100 in real-time during operation of computer system 100. These measurements may be performed: as needed, continuously, or when driven by an event (such as an interrupt). For example, telemetry device 110 may monitor the ambient temperature and the operating temperatures of components (such as processor 112) via one or more thermal sensors 114 and may monitor fan speed of one or more fans 116 via one or more fan-speed sensors 118. Note that fan(s) 116 generates an air flow 120 in computer system 100, which transports heat away from components, such as processor 112.

While the control technique described below leverages temperature and fan-speed measurements, the information gathered by telemetry device 110 can include a wide variety of telemetry signals or data, such as those associated with internal performance parameters or metrics maintained by software (i.e., virtual sensors) within computer system 100. For example, these internal performance metrics can include: system throughput, transaction latencies, queue lengths, load on one or more processors or processor cores, load on the memory, load on the cache, I/O traffic, bus saturation metrics, FIFO overflow statistics, and/or various operational profiles gathered through 'virtual sensors' located within the operating system. Moreover, the information can include telemetry signals or data associated with test performance parameters for synthetic user transactions, which may be periodically generated for the purpose of measuring quality of service from the end user's perspective. Additionally, the information may include hardware or physical variables, including, but not limited to: distributed internal temperatures, environmental variables (such as relative humidity, cumulative or differential vibrations within computer system 100, fan speed, acoustic signals, current noise, voltage noise, and/or time-domain reflectometry readings), and/or energy consumption (such as currents and voltages).

One or more of thermal sensor(s) 114 may be a discrete temperature-sensing device or a temperature-sensing device integrated into a computer system component. In general, temperature measurements by thermal sensor(s) 114 may be based at least on mechanical, electrical and/or optical phenomena. In some embodiments, one or more of thermal sensor(s) 114 includes a thermocouple or a ring oscillator that measures the temperature in computer system 100. In other embodiments, one or more of thermal sensor(s) 114 includes a method or apparatus for monitoring and recording computer system performance parameters as set forth in U.S. Pat. No. 7,020,802, entitled "Method and Apparatus for Monitoring and Recording Computer System Performance Parameters," by Kenny C. Gross and Larry G. Votta, Jr., issued on Mar. 28, 2006, which is hereby fully incorporated by reference.

Furthermore, fan-speed sensor(s) 118 may measure the speed of fan(s) 116 based at least on power signals provided to fan(s) 116 (e.g., using a PWM metric).

In some embodiments, the telemetry data (such as the temperature and fan-speed measurements) are processed by optional resampling device 122. For example, optional resampling device 122 may ensure that the telemetry data have a uniform sampling rate, which can simplify calculations and operations in subsequent processing. In doing so, optional resampling device 122 may use interpolation techniques, if necessary, to fill in missing data points, or to equalize the sampling intervals when the raw data is non-uniformly sampled.

Additionally, in some embodiments optional resampling device 122 de-quantizes the temperature, voltage, current and/or the fan-speed measurements to increase a resolution of the measurements. For example, the measurements may be de-quantized by a 'telemetry signal de-quantizer' that uses the technique set forth in U.S. Pat. No. 7,248,980, entitled "Spectral Synthesis of Telemetry Signals to Remove Signal Quantization Effects," by Kenny C. Gross et al., issued on Jul. 24, 2007, which is hereby fully incorporated by reference. This may allow the control technique described below to be used with low-resolution A/D chips that are used in many computer systems.

Figure 1B:
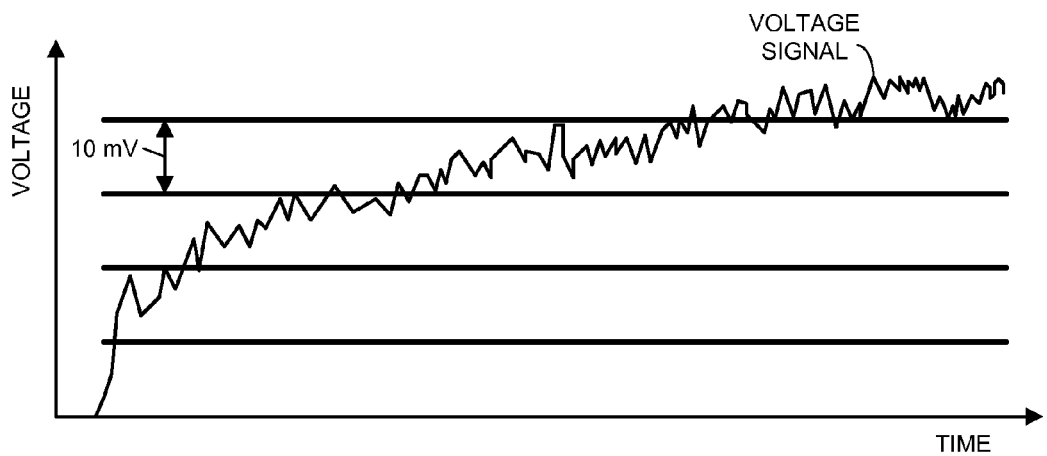
FIG. 1B is a graph illustrating de-quantizing of telemetry signals by the resampling device of FIG. 1A in accordance with an embodiment of the present disclosure.

De-quantizing of telemetry signals by the optional resampling device 122 is shown in FIG. 1B. Because an 8-bit A/D chip is used during the measurements, a voltage signal is quantized into 10 mV bins, illustrated by the horizontal lines in FIG. 1B. De-quantizing the voltage signal, which results in the continuous line in FIG. 1B, reveals that it is slowly drifting due to a degrading interconnect.

Referring back to FIG. 1A, analysis device 124 then validates the telemetry data (such as the temperature and/or fan-speed measurements) using a pattern-recognition model with the telemetry data (e.g., temperature and/or fan-speed measurements) as inputs. In particular, the pattern-recognition model may be a nonlinear, nonparametric regression model, such as a multivariate state estimation technique (MSET) and/or a kernel regression model. Note that MSET refers to a class of pattern-recognition techniques. For example, see "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington, D.C., Nov. 13-17, 2000. This paper outlines several different pattern-recognition approaches. Hence, the term MSET as used in this specification can refer to (among other things) any technique outlined in Gribok et al., including: ordinary least squares (OLS), support vector machines (SVM), artificial neural networks (ANNs), MSET, or regularized MSET (RMSET).

This pattern-recognition model may use correlation patterns between and among some or all of the telemetry variables (including the temperature and/or fan-speed measurements) to detect or identify, with a high sensitivity, if any individual sensors are experiencing physical degradation or de-calibration drift. For example, degradation or drift may be identified based on a difference between one or more measurements from a sensor and additional measurements from one or more other sensors that are correlated with the sensor. Thus, if there are changes in the measurements from the sensor, but these changes are not reflected in the additional measurements from the one or more other sensors, then the sensor may be suspect. Alternatively or additionally, the pattern-recognition model may predict measurement values for the sensor based on the correlation patterns. Deviations from these predictions may indicate that the sensor is degrading or drifting.

If drift or failure of one or more of the thermal sensors 114 and/or fan-speed sensors 118 is identified, the associated measurements may be excluded from use in the control technique. By validating the measurements using the pattern-recognition model, analysis device 124 may keep the control system from incorrectly responding to changing measurement values associated with drifting or failing sensors (which can result in 'hysteresis' phenomena or oscillations during the control of fan(s) 116).

In some embodiments, analysis device 124 aligns and correlates the telemetry data. For example, in some embodiments analysis device 124 uses a moving window technique that 'slides' through the telemetry data with systematically varying window widths. These sliding windows may systematically vary the alignment between windows for different telemetry data to optimize the degree of association between the telemetry data, as quantified by an 'F-statistic,' which may be computed and ranked for all telemetry data windows by analysis device 124.

When statistically comparing the quality of two fits, F-statistics reveal the measure of regression. In particular, the higher the value of the F-statistic, the better the correlation is between two telemetry signals. In some embodiments, the lead/lag value for the sliding window that results in the F-statistic with the highest value is chosen, and the candidate telemetry signal is aligned to maximize this value. This process may be repeated for each telemetry signal by analysis device 124.

Note that telemetry signals that have an F-statistic very close to 1 are 'completely correlated' and can be discarded. This may occur when two telemetry signals are measuring the same metric, but express them in different engineering units. For example, a telemetry signal can convey a temperature in Fahrenheit, while another telemetry signal may convey the same temperature in Centigrade. Because these two telemetry signals are perfectly correlated, one does not contain any additional information over the other; therefore, one may be discarded. Moreover, some telemetry signals may exhibit little correlation, or no correlation whatsoever. In this case, these telemetry signals may be dropped as they add little predictive value.

Once a highly correlated subset of the telemetry signals has been determined, they may be combined into one group or cluster and used to generate one or more pattern-recognition models. These pattern-recognition model(s) may be generated (or updated) during a training mode and/or in real time as the telemetry data is collected.

Figure 1C:
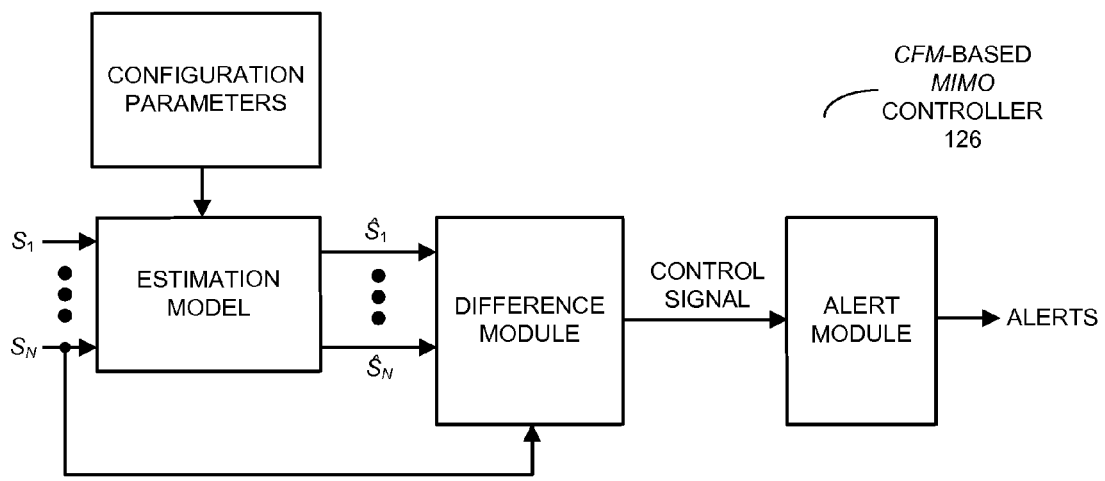
FIG. 1C is a block diagram illustrating the multiple input, multiple output (MIMO) controller of FIG. 1A in accordance with an embodiment of the present disclosure.

After processing by optional resampling device 122 and analysis device 124, the resulting re-sampled, re-quantized and/or 'validated' temperature and fan-speed measurements are provided to CFM-based multiple-input, multiple-output (MIMO) controller 126. CFM-based MIMO controller 126 uses a calibration model of air flow in computer system 100 and/or the slope of the phase-frequency curve of the CPSD to estimate the current air-flow rate of air flow 120 (i.e., the CFM of air flow). (Note that the term "air-flow" can be generalized to include any type of gaseous or liquid coolant flow.) In particular, as shown in FIG. 1C, based at least on the estimated CFM (and, in some embodiments, on one or more additional estimates) and the validated fan-speed measurements (as well as other actual inputs $S_i$), CFM-based MIMO controller 126 determines predicted outputs $\hat{S}_i$. The residual of the difference of an input, such as the actual temperature ($S_N$), and a predicted variable, such as the predicted temperature ($\hat{S}_N$), may be used to generate a control signal (such as a PWM power signal). Referring back to FIG. 1A, one or more such control signals are then provided to fan(s) 116, thereby completing the feedback loop.

For example, the model of air flow may provide the current air-flow rate in computer system 100 based at least on the validated temperature measurements and the fan-speed measurement. Moreover, the model of air flow in computer system 100 may be based at least on air-flow calibration data collected in exemplary computer system(s). These one or more exemplary computer system(s) may be the same type of computer system as computer system 100. Note that the air-flow calibration data may include air-flow measurements performed using an air-flow sensor in the exemplary computer system(s). However, note that CFM-based MIMO controller 126 may determine the current air-flow rate in computer system 100 without using air-flow measurements in computer system 100 (such as those which can be performed using an air-flow sensor) that are performed during the control technique. Furthermore, in some embodiments the model of air flow in the computer system is based at least on simulations of the air flow in computer system 100, which can compensate for differences in the configuration of computer system 100 and the exemplary computer system(s).

Alternatively or additionally, as noted previously, in some embodiments the control signal(s) are determined based at least on the slope of the phase-frequency curve of the CPSD (i.e., using an empirical technique). This empirical technique is described further below with reference to FIG. 3.

In some embodiments, as illustrated in FIG. 1C, CFM-based MIMO controller 126 generates one or more alert(s) (on one or more signal lines 128) based at least on the control signal(s) and/or the current air-flow rate determined by CFM-based MIMO controller 126. Referring back to FIG. 1A, these alert(s) may be provided to an operator of computer system 100. For example, the alert(s) can include: a warning that the temperature in computer system 100 is increasing beyond a threshold value; a warning that air flow 120 in computer system 100 has changed (such as if the air-flow rate is less than a predetermined minimum value, or if the air-flow rate changes by a fixed amount or a predefined percentage), and/or a warning that an air-flow impedance in computer system 100 has changed. These alarm(s) may include generating a maintenance request and/or generating a notification to the operator, such as: an automated email, telephone call, page, turning on a light, and/or generating a sound.

Because analysis device 124 fully validates the temperature and/or fan-speed measurements using the pattern-recognition model (as opposed to using the raw measurements to control fan(s) 116), this control technique is significantly less sensitive to changes in: thermal sensor(s) 114, fan(s) 116, fan-speed sensor(s) 118, flow-rate impedance, etc. Thus, the control technique is not dependent on predefined proxy-variable calibration curves, such as PWM-vs.-RPM and RPM-vs.-CFM curves. In particular, any changes in the sensors or in computer system 100 that do occur will be accommodated by CFM-based MIMO controller 126, i.e., they will be included when estimating the current air-flow rate, and the cooling provisioning in computer system 100 will be modified accordingly. Thus, this control technique is robust (i.e., it may be performed with a low probability of failure under a wide range of conditions).

Figure 2:
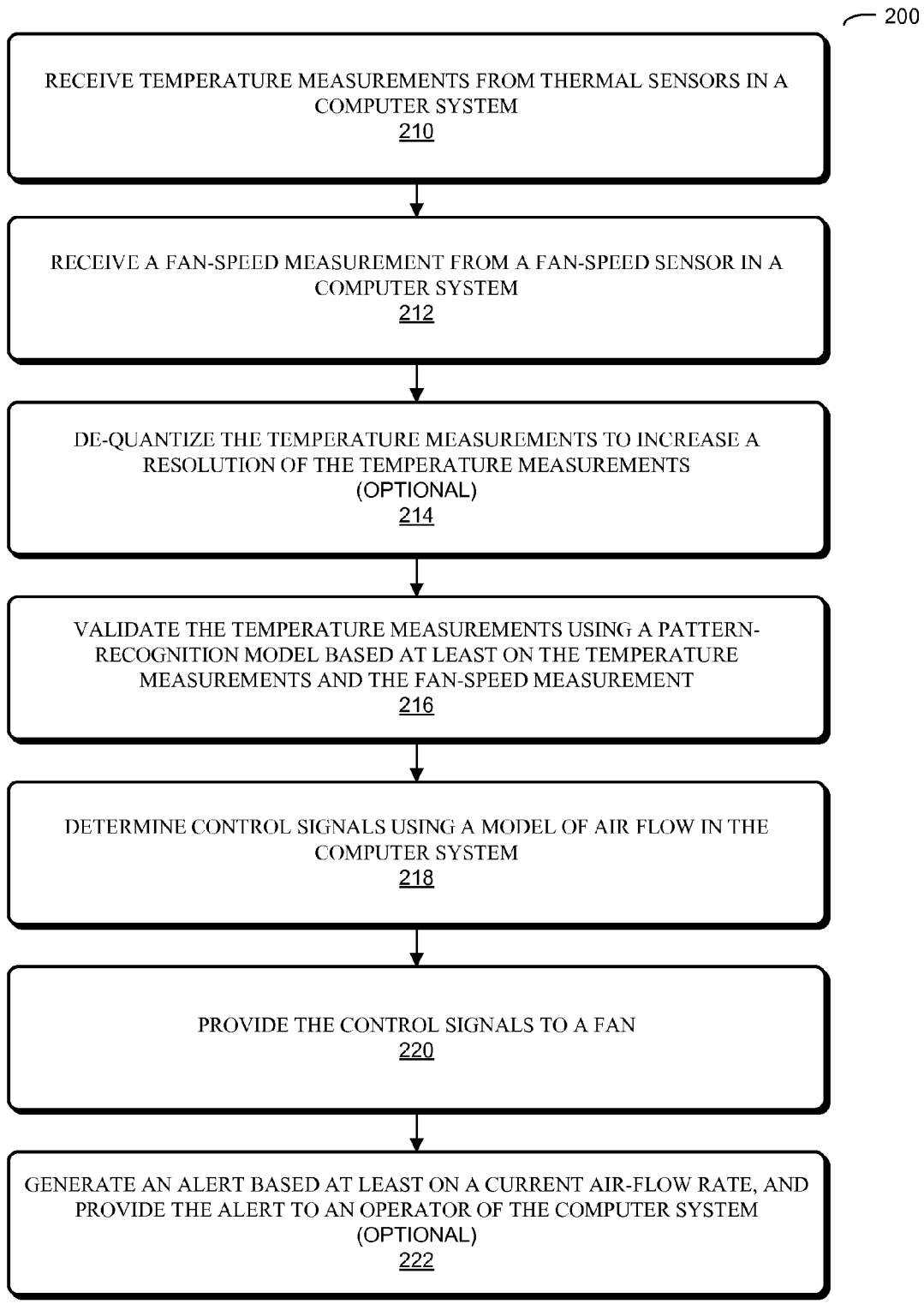
FIG. 2 is a flow chart illustrating a process for providing control signals to a cooling device in the computer system of FIG. 1A in accordance with an embodiment of the present disclosure.

We now describe embodiments of the control technique. FIG. 2 presents a flow chart illustrating a process 200 for providing control signals to a fan in computer system 100 (FIG. 1A), which may be performed by an electronic device in computer system 100 (FIG. 1A) and/or by computer system 100 (FIG. 1A) (for example, by software that executes on computer system 100 in FIG. 1A). During operation, the electronic device receives temperature measurements from thermal sensors in the computer system (operation 210) and receives a cooling-device speed measurement from a cooling-device-speed sensor in the computer system (operation 212). (For example, the cooling-device-speed sensor can be a fan-speed sensor for an air-cooling system or a pump-speed sensor for a liquid-cooling system.) In some embodiments the electronic device optionally de-quantizes the temperature measurements to increase a resolution of the temperature measurements (operation 214).

Then, the electronic device validates the temperature measurements using a pattern-recognition model based at least on the temperature measurements and the fan-speed measurement (operation 216). As discussed previously, this validation may include identifying whether or not the measurements are reliable (e.g., that they are not associated with a failing or drifting sensor) and/or re-sampling the measurements. Moreover, the electronic device determines the control signals using a model of air flow in the computer system (operation 218). Next, the electronic device provides the control signals to the fan (operation 220).

Additionally, in some embodiments the electronic device optionally generates an alert based at least on the current air-flow rate, and the computer system provides the alert to an operator of the computer system (222). For example, the alert can include: a warning that the temperature in the computer system is increasing beyond a threshold value, a warning that the air flow in the computer system has changed, and/or a warning that an air-flow impedance in the computer system has changed.

In some embodiments of process 200, there may be additional or fewer operations. Moreover, the order of the operations may be changed and/or two or more operations may be combined into a single operation.

We now describe determining the air-flow rate in computer system 100 (FIG. 1A) based at least on the slope of the phase-frequency curve of the CPSD. Referring back to FIG. 1A, during operation of computer system 100 thermal sensors 114 may measure the temperature profiles of the air in air flow 120 over time. Telemetry device 110 may monitor these temperature profiles, and CFM-based MIMO controller 126 may use the monitored temperature profiles to determine the CPSD.

In some embodiments, CFM-based MIMO controller 126 transforms the temperature profiles received from telemetry device 110 into frequency-domain representations. The CPSD may be computed from the frequency-domain representation of the temperature profiles from thermal sensors 114. Note that transforming the temperature profiles from the time domain to the frequency domain may involve a Fourier transform, which can include but is not limited to a discrete Fourier transform, such as a fast Fourier transform (FFT). However, other transform functions can be used, including, but not limited to, a Laplace transform and/or a Z-transform. In some embodiments, the CPSD is computed by generating the complex conjugate of the frequency-domain representation of a first temperature profile measured by a first thermal sensor (such as thermal sensor 114-1) and multiplying it by a frequency-domain representation of a second temperature profile measured by a second thermal sensor (such as thermal sensor 114-2).

Alternatively, the CPSD may be computed by first computing the cross-correlation of the time-domain representations of the temperature profiles from at least two of thermal sensors 114. Then, the CPSD may be generated by computing the frequency-domain representation of the cross-correlation. In some embodiments, transforming the cross-correlation from the time domain to the frequency domain involves using a Fourier transform, which can include but is not limited to a discrete Fourier transform, such as the FFT. In other embodiments, other transform functions can be used, including, but not limited to, a Laplace transform and/or a Z-transform.

Figure 3:
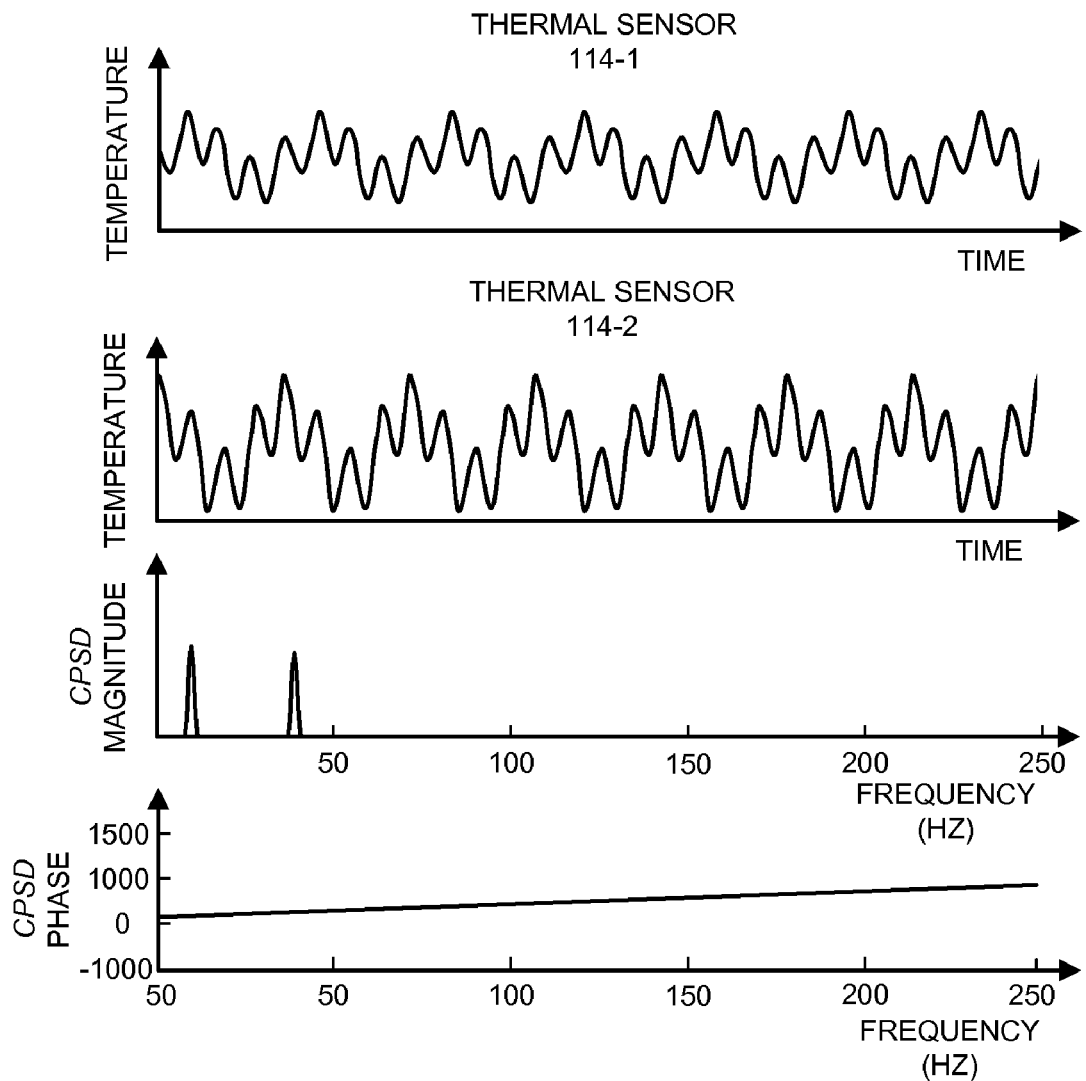
FIG. 3 is a graph illustrating determination of the flow rate using the slope of the phase-frequency curve of the cross spectral density function corresponding to a pair of temperature profiles measured, as a function of time, by a pair of thermal sensors in accordance with an embodiment of the present disclosure.

Note that the resulting CPSD may be represented as a magnitude portion that is a function of frequency and a phase portion that is a function of frequency. Moreover, the phase portion of the CPSD may be represented as a phase angle in degrees versus frequency in hertz, which has a slope in degrees/hertz (degrees·seconds). The transit time in seconds of air flow 120 from thermal sensor 114-1 to thermal sensor 114-2 may be determined by dividing the slope of the CPSD phase vs. frequency by 360 degrees. Then, the air-flow rate in linear feet per minute (LFM) may be determined by dividing a predetermined distance between thermal sensor 114-1 and thermal sensor 114-2 by the transit time, and the CFM may be determined by multiplying the LFM by a cross-sectional area for computer system 100. Determination of the CPSD is illustrated in FIG. 3. The CPSD magnitude has two peaks below 50 Hz, and the CPSD phase varies by 850 degrees over some 200 Hz.

Note that the predetermined distance between thermal sensor 114-1 and thermal sensor 114-2 and/or the cross-sectional area of computer system 100 may be determined: by analysis of the design of computer system 100, during calibration testing of computer system 100, and/or by any other suitable technique known to one of skill in the art. For example, during calibration testing of computer system 100 (prior to putting computer system 100 in the field), the predetermined distance between thermal sensor 114-1 and thermal sensor 114-2 and/or the cross-sectional area of computer system 100 may be determined using air-flow meters to measure the LFM and CFM, and the CPSD technique just described may be used to determine the transit time. The predetermined distance between thermal sensor 114-1 and thermal sensor 114-2 may be determined by multiplying the measured LFM by the transit time, and the cross-sectional area may be determined by dividing the measured CFM by the measured LFM.

Additionally, in some embodiments, during calibration, the LFM and CFM are determined for a set of speeds for fan(s) 116. In these embodiments, CFM-based MIMO controller 126 may use the predetermined distance and the monitored speeds of fan(s) 116 to determine the LFM and CFM during operation of computer system 100.

In some embodiments, CFM-based MIMO controller 126 averages CPSDs determined during a predetermined time period prior to determining the LFM or CFM using the previously described CPSD technique. This predetermined time period may be determined based at least on information including, but not limited to, one or more of: the rate at which temperature profiles are monitored by telemetry device 110, the rate at which the speed of fan(s) 116 is changed, or the rate of change of any other thermal process in computer system 100.

Note that in embodiments with more than two fan(s) 116, thermal sensor(s) 114 may monitor the temperature profiles associated with these fans. CFM-based MIMO controller 126 may determine CPSDs based at least on temperature profiles from pairs of thermal sensor(s) 114 using the previously described CPSD technique. The transit time for each pair of thermal sensors may also be determined as described previously. Similarly, the LFM may be determined based at least on the predetermined distance between each pair of thermal sensors, and the CFM may be determined from the LFM based at least on the cross-sectional area determined for the air flow between the pairs of thermal sensors. Note that, as described above, the predetermined distance and cross-sectional area between each pair of thermal sensors in a given pair of thermal sensors may be determined by directly computing the predetermined distance and the effective cross-sectional area and/or by determining these values using measurements during a calibration period in which the LFM and CFM are directly measured.

Figure 4:
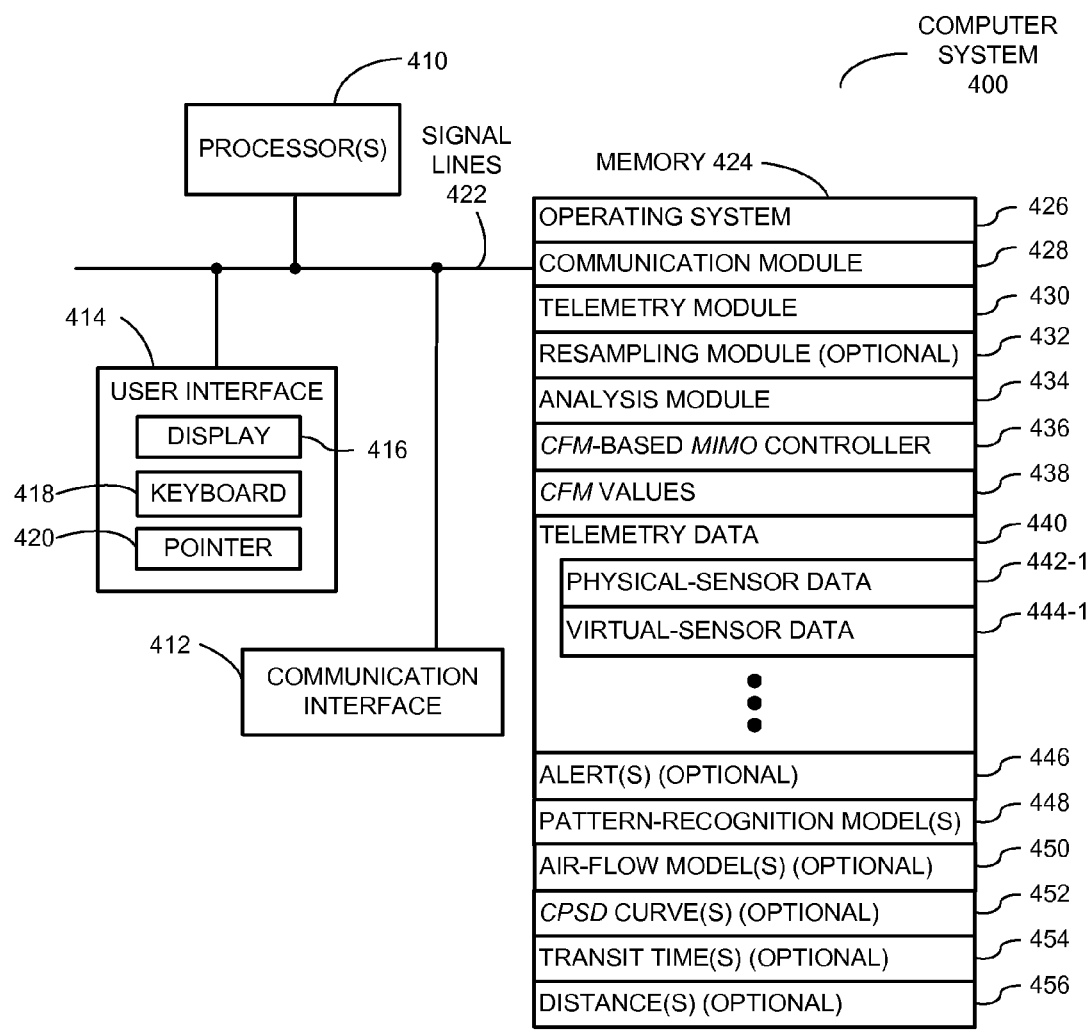
FIG. 4 is a block diagram illustrating a computer system that performs the process of FIG. 2 in accordance with an embodiment of the present disclosure.

We now further describe embodiments of computer system 110 (FIG. 1A). FIG. 4 presents a block diagram illustrating a computer system 400 (such as computer system 100 in FIG. 1A) that performs process 200 (FIG. 2). Computer system 400 includes: one or more processors (or processor cores) 410, a communication interface 412, a user interface 414, and one or more signal lines 422 coupling these components together. Note that the one or more processors (or processor cores) 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. Moreover, memory 424 may also store communications procedures (or a set of instructions) in a communication module 428. These communication procedures may be used for communicating with one or more computers, devices and/or servers, including computers, devices and/or servers that are remotely located with respect to computer system 400. For example, computer system 400 may communicate with one or more of these computers, devices and/or servers via network, such as: the Internet, World Wide Web (WWW), an intranet, LAN, WAN, MAN, or a combination of networks, or other technology enabling communication between computing systems.

Memory 424 may also include one or more program modules (or sets of instructions), including: telemetry module 430 (or a set of instructions), optional resampling module 432 (or a set of instructions), analysis module 434 (or a set of instructions), and/or CFM-based MIMO controller 436 (or a set of instructions). Note that one or more of program modules may constitute a computer-program mechanism.

Telemetry module 430 may measure, collect or infer telemetry data 440, such as physical-sensor data 442-1 and virtual-sensor data 444-1 at different times. For example, during the measurements, telemetry module 430 may poll or sample information determined by physical sensors and/or virtual sensors in computer system 400 to collect or infer telemetry data 440. Then, optional resampling module 432 may resample and/or de-quantize at least some of telemetry data 440, such as temperature measurements. Next, analysis module 434 may validate at least some of telemetry data 440 using one or more pattern-recognition models 448.

Furthermore, CFM-based MIMO controller 436 may determine CFM values 438 using the validated telemetry data and one or more optional air-flow models 450. Alternatively or additionally, CFM-based MIMO controller 436 may determine one or more optional CPSD curves 452 using the validated telemetry data (such as at least one pair of temperature profiles), and may determine CFM values 438 from the one or more optional CPSD curves 452 using one or more optional transit times 454 and one or more optional predetermined distances 456.

After determining the CFM values 438, CFM-based MIMO controller 436 may generate control signals that are provided to one or more fans in computer system 400.

In some embodiments, CFM-based MIMO controller 436 generates one or more optional alerts 446 based at least on the CFM values 438. The one or more optional alerts 446 may be provided to an operator of computer system 400.

Instructions in the various modules in the memory 424 may be implemented in: a high-level procedural language, an object-oriented programming language, and/or in an assembly or machine language. The programming language may be compiled or interpreted, i.e., configurable or configured, to be executed by the one or more processors (or processor cores) 410.

Computer system 400 may include, but is not limited to: a server, a laptop computer, a personal computer, a work station, a mainframe computer, a blade, an enterprise computer, a field-replaceable unit, a data center, a portable-computing device, a supercomputer, a network-attached-storage (NAS) system, a storage-area-network (SAN) system, and/or another electronic computing device. Note that computer system 400 may be at one location or may be distributed over multiple, geographically dispersed locations. Consequently, at least portions of telemetry system 108 associated with computer system 100 (FIG. 1A) may be implemented locally (in computer 100 in FIG. 1A) and/or at one or more remote locations, such as a plurality of computer systems including computer system 100 (FIG. 1A) and/or other remote computer systems.

Computer systems 100 (FIG. 1A) and/or 400 may include fewer components or additional components. For example, in other embodiments that use a liquid coolant, fan(s) 116 (FIG. 1A) may be replaced by pump(s). Furthermore, optional resampling device 122 (FIG. 1A), analysis device 124 (FIG. 1A), and/or CFM-based MIMO controller 126 (FIG. 1A) may constitute an electronic device (such as an integrated circuit).

Although these circuits and systems are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. Note that some or all of the functionality of computer systems 100 (FIG. 1A) and/or 400 may be implemented in one or more ASICs, FPGAs and/or one or more digital signal processors (DSPs). Furthermore, functionality in computer systems 100 (FIG. 1A) and/or 400 may be implemented more in hardware and less in software, or less in hardware and more in software, as is known in the art. Thus, for example, telemetry device 110 may be implemented in software and/or in hardware.

Note that in some embodiments, fan 116 (FIG. 1A) can be operated using a continuous variable fan speed. In these embodiments, workload in computer system 100 (FIG. 1A) may be included as an input to CFM-based MIMO controller 126 (FIG. 1A). Furthermore, in some embodiments operating history and altitude may be used as inputs to CFM-based MIMO controller 126 (FIG. 1A). Additionally, in these embodiments, CFM-based MIMO controller 126 (FIG. 1A) may be trained over a full range of operating conditions of computer system 100 (FIG. 1A).

Figure 5:
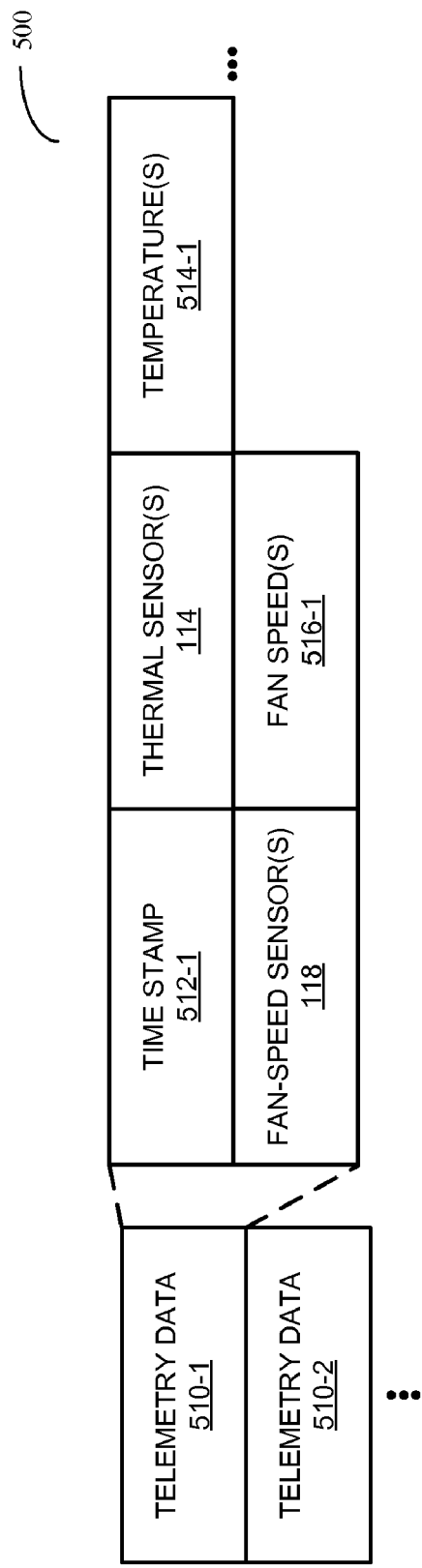
FIG. 5 is a block diagram illustrating a data structure for use in the computer system of FIG. 4 in accordance with an embodiment of the present invention.

We now describe embodiments of data structures that may be used in computer system 400. FIG. 5 presents a block diagram illustrating a data structure 500 for use in computer system 400 (FIG. 4). This data structure may include telemetry data 510. More specifically, a given instance of the telemetry data 510 (such as telemetry data 510-1) may include: a time stamp 512-1, one or more identifiers of thermal sensors 114, one or more associated temperature measurements 514-1, one or more identifiers of fan-speed sensors 118, and/or one or more associated fan-speed measurements 516-1.

Note that in some embodiments of the data structure 500 there may be fewer or additional components. Moreover, two or more components may be combined into a single component and/or a position of one or more components may be changed.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A method for providing control signals to a cooling device in a computer system, comprising:
receiving temperature measurements from thermal sensors in the computer system;
receiving a cooling-device speed measurement from a cooling-device speed sensor in the computer system;
validating the temperature measurements using a pattern-recognition model based at least on the temperature measurements and the cooling-device speed measurement;
determining the control signals using a model of coolant flow in the computer system, wherein the model of coolant flow provides a current coolant-flow rate in the computer system based at least on the validated temperature measurements and the cooling-device speed measurement, and wherein the model of coolant flow in the computer system is based at least on coolant-flow calibration data collected in an exemplary computer system; and
providing the control signals to the cooling device.

2. The method of claim 1, wherein the control signals are further determined based at least on a slope of a phase-frequency curve of a cross power spectral density function corresponding to a pair of temperature profiles measured, as a function of time, by a pair of thermal sensors.

3. The method of claim 1, wherein validating the temperature measurements involves identifying drift or failure in one or more of the thermal sensors and, if drift or failure of one or more of the thermal sensors is identified, excluding the temperature measurements associated with the one or more thermal sensors.

4. The method of claim 1, wherein the pattern-recognition model includes a nonlinear, nonparametric regression model.

5. The method of claim 1, wherein the current coolant-flow rate is determined without performing coolant-flow measurements using a coolant-flow sensor in the computer system.

6. The method of claim 1, wherein the exemplary computer system is the same type of computer system as the computer system.

7. The method of claim 1, wherein the coolant-flow calibration data includes coolant-flow measurements performed using a coolant-flow sensor in the exemplary computer system.

8. The method of claim 1, further comprising de-quantizing the temperature measurements to increase a resolution of the temperature measurements.

9. The method of claim 1, wherein the model of coolant flow in the computer system is based at least on simulations of coolant flow in the computer system, thereby compensating for differences in the configuration of the computer system and the exemplary computer system.

10. The method of claim 1, further comprising:
generating an alert based at least on the current coolant-flow rate; and
providing the alert to an operator of the computer system.

11. The method of claim 10, wherein the alert includes a warning that the temperature in the computer system is increasing beyond a threshold value, a warning that the coolant flow in the computer system has changed, or a warning that a coolant-flow impedance in the computer system has changed.

12. A computer-program product for use in conjunction with a computer system, the computer-program product comprising a computer-readable storage medium and a computer-program mechanism embedded therein for providing control signals to a cooling device in a computer system, the computer-program mechanism including:
instructions for receiving temperature measurements from thermal sensors in the computer system;
instructions for receiving a cooling device-speed measurement from a cooling-device speed sensor in the computer system;
instructions for validating the temperature measurements using a pattern-recognition model based at least on the temperature measurements and the cooling-device speed measurement;
instructions for determining the control signals using a model of coolant flow in the computer system, wherein the model of coolant flow provides a current coolant-flow rate in the computer system based at least on the validated temperature measurements and the cooling-device speed measurement, and wherein the model of coolant flow in the computer system is based at least on coolant-flow calibration data collected in an exemplary computer system; and
instructions for providing the control signals to the cooling device.

13. The computer-program product of claim 12, wherein validating the temperature measurements involves identifying drift or failure in one or more of the thermal sensors and, if drift or failure of one or more of the thermal sensors is identified, excluding the temperature measurements associated with the one or more thermal sensors.

14. The computer-program product of claim 12, wherein the pattern-recognition model includes a nonlinear, nonparametric regression model.

15. The computer-program product of claim 12, wherein the exemplary computer system is the same type of computer system as the computer system.

16. The computer-program product of claim 12, wherein the control signals are further determined based at least on a slope of a phase-frequency curve of a cross power spectral density function corresponding to a pair of temperature profiles measured, as a function of time, by a pair of thermal sensors.

17. The computer-program product of claim 12, further comprising de-quantizing the temperature measurements to increase a resolution of the temperature measurements.

18. The computer-program product of claim 12, wherein the current coolant-flow rate is determined without performing coolant-flow measurements using a coolant-flow sensor in the computer system.

19. The computer-program product of claim 12, the computer-program mechanism further comprising:
instructions for generating an alert based at least on the current coolant-flow rate; and
instructions for providing the alert to an operator of the computer system.

20. A computer system, comprising:
a processor;
a memory;
a program module, wherein the program module is stored in the memory and configured to be executed by the processor, the program module including instructions for providing control signals to a cooling device in a computer system, the instructions including:
instructions for receiving temperature measurements from thermal sensors in the computer system;
instructions for receiving a cooling-device speed measurement from a cooling-device speed sensor in the computer system;
instructions for validating the temperature measurements using a pattern-recognition model based at least on the temperature measurements and the cooling-device speed measurement;
instructions for determining the control signals using a model of coolant flow in the computer system, wherein the model of coolant flow provides a current coolant-flow rate in the computer system based at least on the validated temperature measurements and the cooling-device speed measurement, and wherein the model of coolant flow in the computer system is based at least on coolant-flow calibration data collected in an exemplary computer system; and
instructions for providing the control signals to the cooling device.

* * * * *